United States Patent [19]

Noll et al.

[11] 4,032,019
[45] June 28, 1977

[54] BILLET CONVEYOR AND TURNER

[75] Inventors: Stanley Darwin Noll, Shaker Heights; William F. Delfeld, Lyndhurst, both of Ohio

[73] Assignee: Production Experts, Inc., Cleveland, Ohio

[22] Filed: Aug. 25, 1975

[21] Appl. No.: 607,216

[52] U.S. Cl. ............................................ 214/1 QG
[51] Int. Cl.$^2$ ........................................... B65G 7/00
[58] Field of Search ............. 214/1 QG, 1 Q, 1 QB, 214/1 R; 198/286, 234, 236

[56] References Cited

UNITED STATES PATENTS

| | | | |
|---|---|---|---|
| 3,724,682 | 4/1973 | Parris | 214/1 QG |
| 3,726,420 | 4/1973 | Stratton | 214/1 QG |
| 3,732,990 | 5/1973 | Suter | 214/1 QG |
| 3,941,255 | 3/1976 | Wolf | 214/1 QG |

Primary Examiner—Trygve M. Blix
Assistant Examiner—Douglas C. Butler
Attorney, Agent, or Firm—Isler and Ornstein

[57] ABSTRACT

A billet turner which is especially adapted for use between sections of a furnace charging table. The billet turner is designed to turn a billet of square cross-section about its longitudinal axis, in 90° increments, and in either direction, for the purpose of obtaining a desired camber direction of the billet or to expose identification marks on the billet. Provision is made for driving the billet through the turner on and by independently driven rolls. The billet turner mechanism is mounted on a frame which may be raised or lowered in relation to a stationary supporting base. The billet turner includes a mechanism for lifting the billet from the driving rolls, prior to turning of the billet.

6 Claims, 8 Drawing Figures

BILLET CONVEYOR AND TURNER

This invention relates, as indicated, to a billet turner, but is directed more particularly to a billet turner of the character described, which is adapted to be positioned between sections of a furnace charging table.

A primary object of the invention is to provide a billet turner of the character described, which is adapted to turn a billet of square cross-section about its longitudinal axis, in 90° increments, and in either direction about said axis, for the purpose of obtaining a desired camber direction of the billet or to expose identification marks on the billet.

Another object of the invention is to provide a billet turner of the character described, wherein the billet is driven through the billet turner on and by independently driven rolls, and wherein said rolls are mounted on a stationary base, and the billet turner mechanisms are mounted on a frame or billet turner base which may be raised or lowered, in relation to said stationary base.

A further object of the invention is to provide a billet turner of the character described, having billet turning mechanism which is adapted to lift the billet from the driving rolls prior to turning of the billet.

Other objects and advantages of our invention will be apparent during the course of the following description.

In the accompanying drawings forming a part of this specification, and in which like numerals are employed to designate like parts throughout the same, FIG. 1 is a top plan view of the billet turner, with portions broken away to better illustrate certain features;

Figure 1:
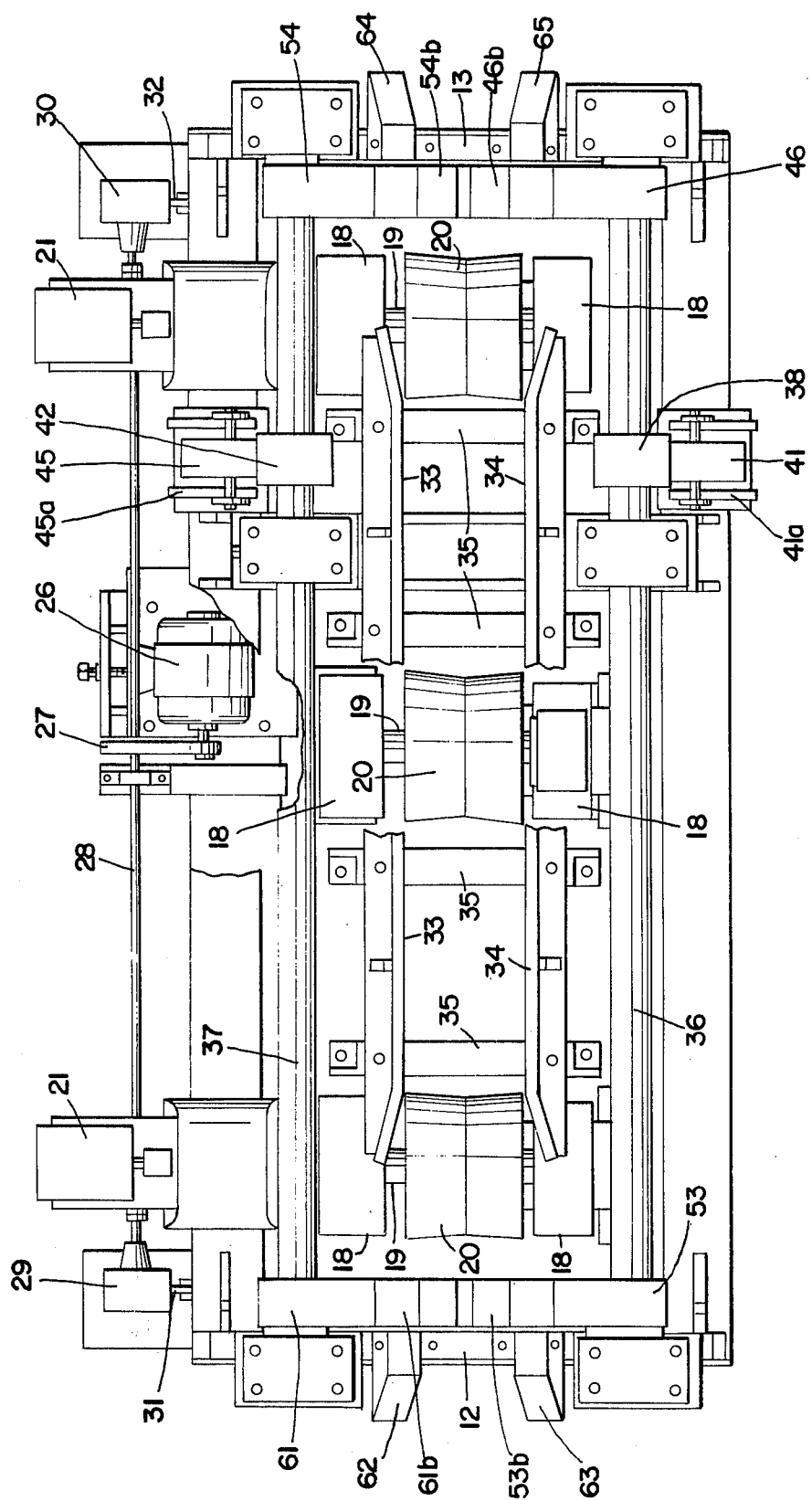

Referring more particularly to the drawings, the billet turner will be seen to comprise a stationary base comprising longitudinally spaced bars 1 and 2, from the centers of which bars 3 extend perpendicularly.

The bars 1 and 2 provide a means for anchoring the transversely-spaced, longitudinally-extending H-beams 4 and 5, which, in turn, support a pair of longitudinally-spaced, transversely-extending I-beams 6 and 7. The beams 6 and 7 provide supports for a pair of transversely-spaced, longitudinally-extending I-beams 8 and 9, which are interconnected by a pair of longitudinally-spaced I-beams (not shown).

Mounted for vertical movement relative to the aforesaid stationary base is a billet turner frame or structure, which comprises a pair of transversely-spaced, longitudinally-extending H-beams 10 and 11, upon the ends of which upright end members or walls 12 and 13 are supported.

Figure 2:
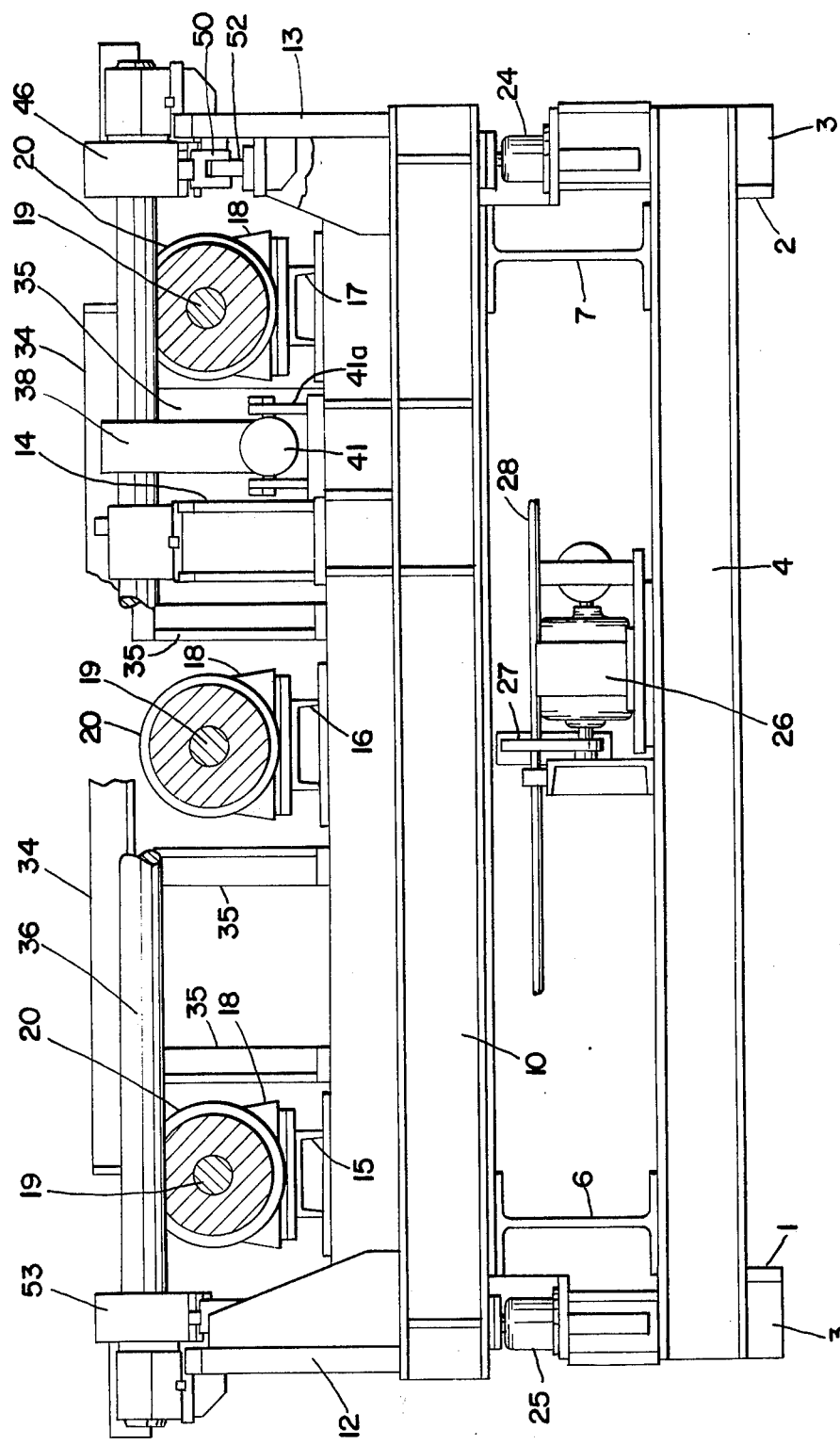
FIG. 2 is a side elevational view of the billet turner, as viewed from the bottom of FIG. 1, and with portions removed to show certain features of construction.

The beams 10 and 11 also provide supports for an intermediate member or wall generally designated by reference numeral 14 (FIG. 2).

Mounted on the stationary base are feed roller units comprising spaced supports 15, 16 and 17 for bearings 18, in which are journalled shafts 19 for driven billet supporting rolls 20, having peripheral surfaces of V-shaped configuration, designed to center the billets supported thereon with respect to said rolls.

The rolls 20 are individually driven by means of motors 21.

Figure 3:
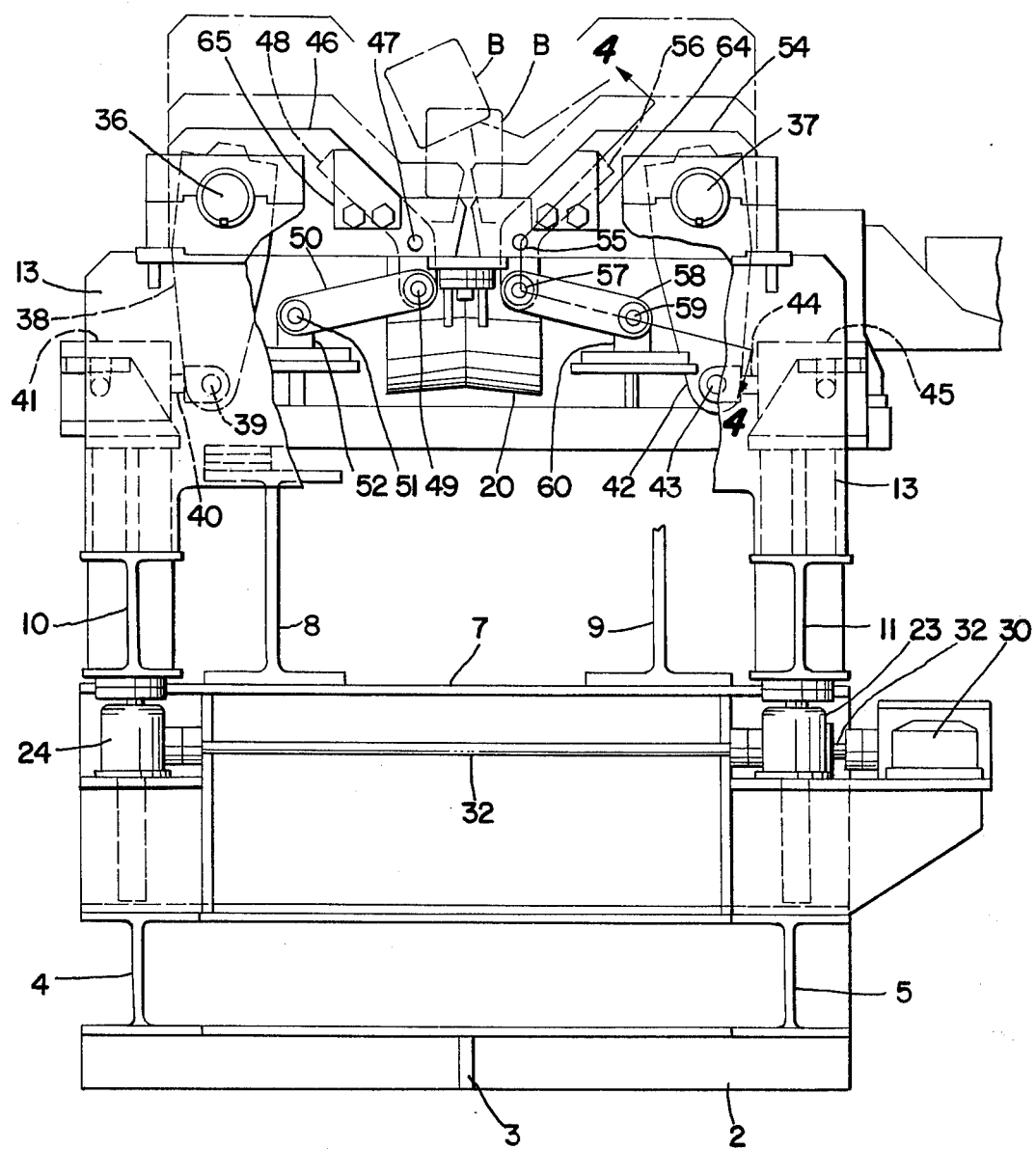
FIG. 3 is an end elevational view of the billet turner, as viewed from the right end of FIG. 2, and with portions broken away to illustrate parts or details of the billet turning mechanism.
Figure 4:
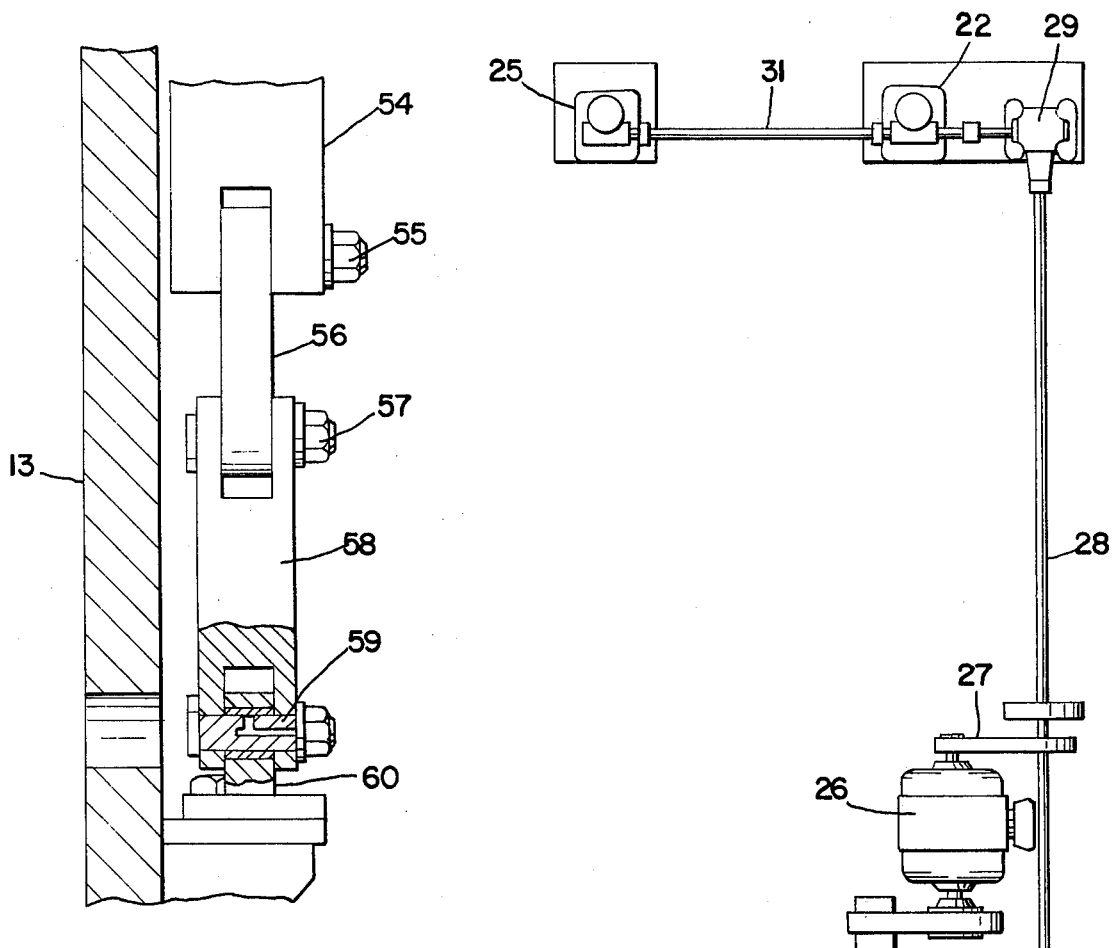
FIG. 4 is a fragmentary cross-sectional view, taken on the line 4—4 of FIG. 3.
Figure 5:
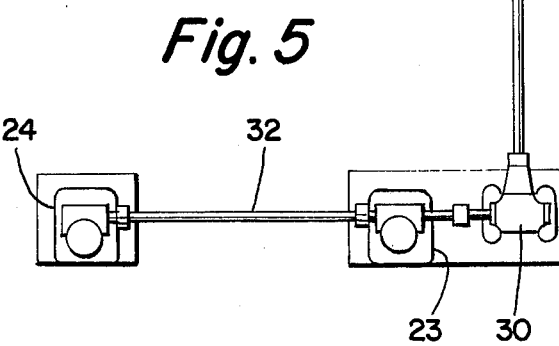
FIG. 5 is a view illustrating in plan or somewhat diagrammatic form, the drive or elevating and lowering mechanism for the billet lifting table, frame or structure.

For the purpose of elevating and lowering the billet-turner frame or structure which has been described, relatively to the stationary base, the stationary base is provided at the corners thereof, as best seen in FIGS. 2, 3 and 5, with jacks 22, 23, 24 and 25, which are interposed between said corners and the ends of the beams 10 and 11.

The jacks 22 and 23 are driven by an electric motor 26, supported on the beam 5, through the intermediary of an endless belt or chain 27, shaft 28, and gear boxes 29 and 30. The jacks 25 and 24 are driven by the shafts 31 and 32, as best seen in FIG. 5.

For the purpose of guiding the billet during its movement by the rolls 20, side guides 33 and 34 are provided, which are supported by upright supports 35, which, in turn, are secured to the billet supporting table, frame or structure.

For the purpose of turning the billet, mechanism is provided, which is best seen in FIGS. 1, 2, 3, 4, 6, 7 and 8.

Such mechanism comprises a pair of shafts 36 and 37, which are mounted for rocking or oscillatory movement in the end walls 12 and 13 and intermediate wall 14.

The shaft 36 has keyed thereto, adjacent the wall 14, a lever 38, which is pivotally connected, as at 39, to the inboard end of a piston rod 40, of a hydraulic cylinder 41 mounted for pivotal movement on a bracket 41a which is mounted on the billet turner frame.

The shaft 37 has similarly keyed thereto, adjacent the wall 14, a lever 42, which is pivotally connected, as at 43, to the inboard end of a piston rod 44, of a hydraulic cylinder 45 mounted for pivotal movement on a bracket 45a which is mounted on the billet turner frame.

The shaft 36 has keyed thereto, at one end, a lever 46, to which is pivotally secured, as at 47, a flip lever 48. The lever 48 is pivotally secured, as at 49, to a link 50. The link 50 is pivotally secured, as at 51, to a bracket 52, which is supported by the billet-turner frame. The lever 46 has an extension 46a, which provides a billet-supporting surface 46b.

The shaft 36 has keyed thereto, at its opposite end, a lever 53, which is identical in construction and function or use, with the lever 46, and is connected, as by a flip lever, link and bracket, to the billet-turner frame, in the same manner as is the lever 46. The lever 53 has an extension which provides a billet-supporting surface 53b (see FIG. 1).

The shaft 37 has keyed thereto, at one end, a lever 54, to which is pivotally secured, as at 55, a flip lever 56. The lever 56 is pivotally secured, as at 57, to a link 58. The link 58 is pivotally secured, as at 59, to a bracket 60, which is supported by the billet-turner frame. The lever 54 has an extension 54a, which provides a billet-supporting surface 54b.

The shaft 37 has keyed thereto, at its opposite end, a lever 61, which is identical in construction and function or use, with the lever 53 and is connected, as by a flip lever, link, and bracket, to the billet-turner frame, in the same manner as is the lever 54. The lever 61 has an extension which provides a billet-supporting surface 61b.

The end wall 12 has mounted thereon, a pair of billet entrance guides 62 and 63, while the end wall 13 has mounted thereon a pair of similar billet entrance guides 64 and 65.

The operation of the billet turner may now be described in detail, and more particularly with reference to FIGS. 3, 6, 7 and 8, wherein the billet is indicated by reference character B.

Figure 6:
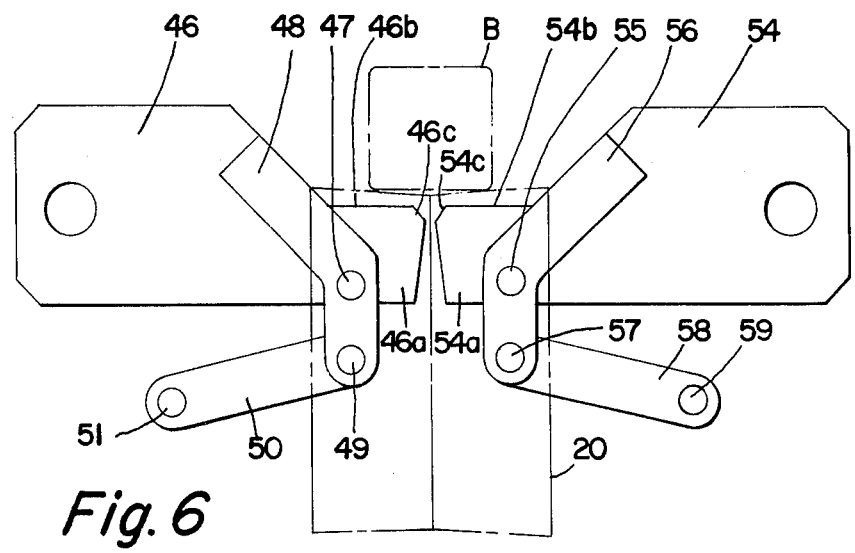
FIG. 6 is a view illustrating, in somewhat diagrammatic form, the position of the billet turning elements or parts, when the billet is supported on the billet driving rolls.

The billet is introduced or fed into the billet turner in any desired manner, and is positioned on the driving rolls 20 in the manner shown in FIG. 6.

Figure 7:
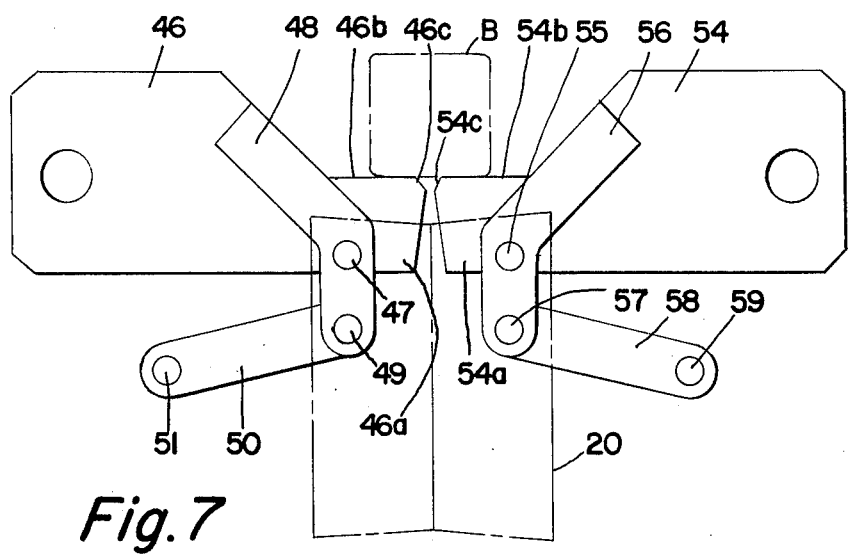
FIG. 7 is a view similar to FIG. 6, but showing the billet in elevated position, prior to turning of the billet.

The billet B is then lifted from the rolls 20 from the position shown in FIG. 6 to that shown in FIG. 7, without any change in the positions of the levers 46, 54, 48, 56 and links 50 and 58 relatively to each other. This is accomplished by elevating the billet-turner frame or structure relatively to the stationary base, by actuation of the jacks 22, 23, 24 and 25.

For the purpose of turning the billet B 90°, in a clockwise direction about its axis, from the position shown in FIG. 7, fluid is introduced into the cylinder 41 in a manner to cause the piston rod 40 to move to the right, as seen in FIG. 3, thus causing the lever 38 to rock in a counterclockwise direction. This, in turn, causes the shaft 36 to rotate, in a counterclockwise direction, and the levers 46 and 53 to move from the position shown in FIG. 7 to that shown in FIG. 8. This movement causes the flip lever 48 (and its counterpart flip lever at the opposite end of the billet turner) to move to the position shown in FIG. 8, causing the flip levers to push the billet B along the billet-supporting surfaces 46b and 53b, to the position shown at B in FIG. 8.

Figure 8:
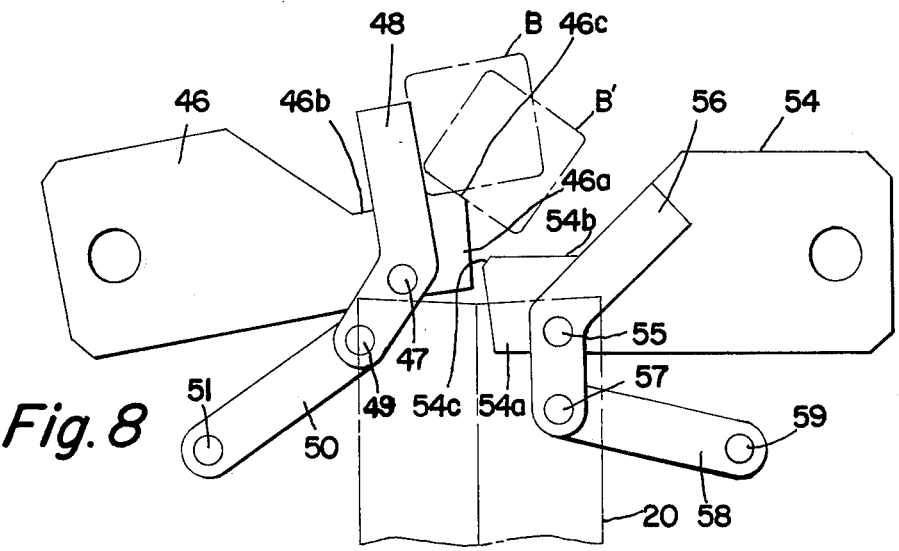
FIG. 8 is a view similar to FIG. 7, but showing the relative position of the billet turning elements when turning the billet 90°, in a clockwise direction, from the position shown in FIG. 7 to that shown in FIG. 8.

When the billet arrives at the position shown at B in FIG. 8, the weight of that portion of the billet to the right of the corner 46c is greater than the weight of that portion of the billet to the left of the corner 46c, so that the billet flips over, to the position indicated at B', and comes to rest on the supporting surface 54b of the lever 54.

When the lever 46 is returned to the position shown in FIG. 7, the billet B will come to rest in the position shown in FIG. 7, but 90°, in a clockwise direction from its initial position in FIG. 7. This return of the lever 46 is effected by introducing fluid into the cylinder 41 in a manner to cause the piston rod 40 to move to the left, as seen in FIG. 3.

In order to cause the billet B to turn another 90° in a clockwise direction about its axis, the foregoing movements are repeated. Repetition of this 90° movement may be effected, as many times as desired.

For the purpose of turning the billet B in a counterclockwise direction about its axis, from the position shown in FIG. 7, fluid is introduced in the cylinder 45 in a manner to cause the piston rod 44 to move to the left, as seen in FIG. 3, thus causing the lever 42 to rock in a clockwise direction. This, in turn, causes the shaft 37 to rotate in a clockwise direction, and the levers 54 and 61 to move from the position shown in FIG. 7 to a position which may be described as corresponding to the positions of the lever 46 and 53 in FIG. 8, but in symmetrical relation to the latter. This movement causes the flip lever 56 (and its counterpart flip lever at the opposite end of the billet turner) to move to a position such as to cause the flip levers to push the billet upwardly along the supporting surfaces 54b and 61b.

When the billet arrives at a position such that the weight of that portion of the billet to the left of the corner 54c is greater than the weight of that portion of the billet to the right of the corner 54c, the billet will flip over, in a counterclockwise direction, and come to rest on the supporting surface 46b of the lever 46.

When the lever 54 is returned to the position shown in FIG. 7, the billet will come to rest in the position shown in FIG. 7, but 90° in a counterclockwise direction from its initial position in FIG. 7. This return of the lever 54 is effected by introducing fluid into the cylinder 45 in a manner to cause the piston rod 44 to move to the right, as seen in FIG. 3.

In order to cause the billet to turn another 90° in a counterclockwise direction about its axis, the foregoing movements are repeated, and repetition of this 90° movement may be effected as many times as desired.

It may be noted, also, that the driving rolls 20 may be rotated in either direction, and the billet introduced onto said rolls from either end of the billet turner.

After the necessary turning of the billet has been completed, the jacks 22, 23, 24 and 25 are actuated to lower the billet-turner frame or structure to cause the billet to be deposited on the rolls 20, so that these rolls, when activated, can move the fillet out of the billet turner.

It is thus seen that we have provided a billet turner which is well adapted to fulfill all of the objects or purposes for which it has been designed.

It is to be understood that the form of our invention, herewith shown and described, is to be taken as a preferred example of the same, and that various changes may be made in the shape, size and arrangement of parts thereof, without departing from the spirit of the invention or the scope of the subjoined claims.

Having thus described our invention, we claim:

1. In a billet turner, billet turner mechanism comprising a pair of spaced parallel shafts, means for selectively imparting oscillatory movement to said shafts about their axes, billet support levers secured to said shafts, each of said levers including a billet support, said billet support of each of said levers being normally disposed in a common horizontal plane, and a flip lever pivotally secured to each of said first-named levers and movable relative to the latter whereby when one of said parallel shafts is rotated about its axis, its billet support lever will cause the billet support to be elevated out of said common plane and its flip lever will cause the billet to be moved along said billet support extension to the end of said extension and to fall by gravity onto the billet support extension of the other lever, and simultaneously turn about the longitudinal axis of the billet.

2. Billet turner mechanism, as defined in claim 1, including links pivotally secured to said flip levers and effective upon pivotal movement of said first-named levers to cause said pivotal movement of the flip levers relatively to said first-named levers.

3. Billet turner mechanism, as defined in claim 2, wherein said billet-supporting extensions are in opposed relationship to each other, whereby, when said billet is moved along one of said extensions to a point at which the billet can turn, said billet will fall upon the other of said extensions.

4. Billet turner mechanism, as defined in claim 3, wherein said flip levers are of angular shape.

5. Billet turner mechanism, as defined in claim 4, wherein said extensions, when in opposed relationship with each other, provide a coplanar surface for supporting the billet prior to turning of the billet.

6. Billet turner mechanism comprising a pair of spaced parallel shafts, a billet support lever secured to at least one of said shafts and having a billet supporting extension, a flip lever pivotally secured to said first-named lever and movable relatively to the latter to move a billet along said extension, means for rotating said one shaft in a direction wherein said movement of said billet causes the billet to fall off said extension and simultaneously turn in a clockwise direction about its horizontal axis, a billet supporting lever secured to the other of said shafts and having a billet supporting extension thereon, a flip lever pivotally secured to said last-named lever and movable to cause movement of said billet along said last-named extension, and means for rotating the other of said shafts in a direction wherein said movement of said billet causes the billet to fall off the extension of said last-named lever and turn in an anti-clockwise direction about its horizontal axis.

* * * * *

UNITED STATES PATENT OFFICE
CERTIFICATE OF CORRECTION

Patent No. 4,032,019　　　　　　　　　Dated June 28, 1977

Inventor(s) Stanley Darwin Noll et al.

It is certified that error appears in the above-identified patent and that said Letters Patent are hereby corrected as shown below:

On the cover sheet delete the figure as shown and substitute the following figure therefor.

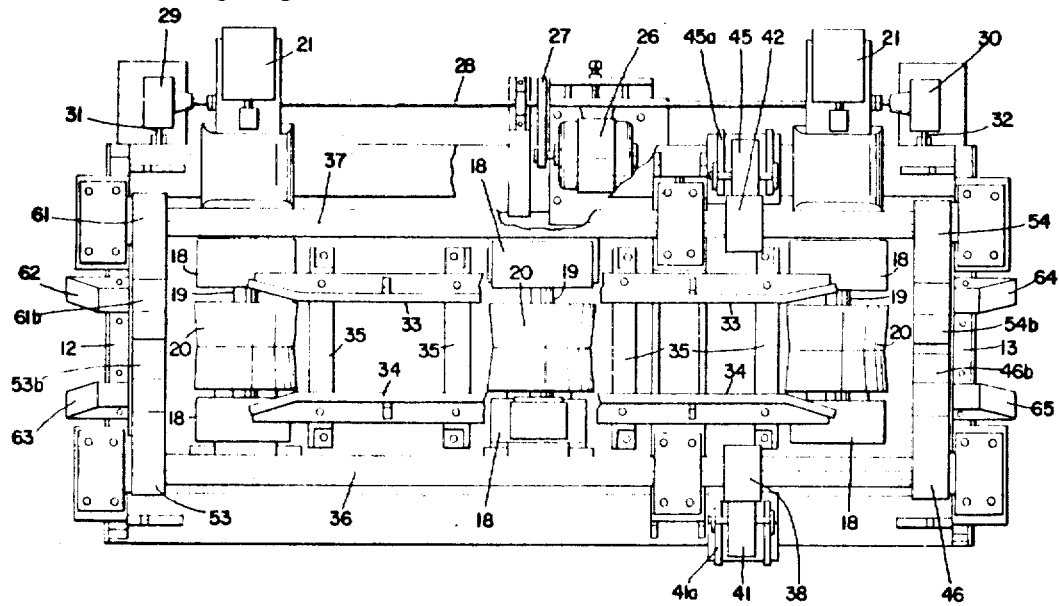

Signed and Sealed this

Twentieth Day of September 1977

[SEAL]

Attest:

RUTH C. MASON
Attesting Officer

LUTRELLE F. PARKER
Acting Commissioner of Patents and Trademarks